(12) United States Patent
Krammel

(10) Patent No.: US 9,701,339 B2
(45) Date of Patent: Jul. 11, 2017

(54) VEHICLE WITH TILTING FRAME

(71) Applicant: Werner Krammel, Bad Abbach (DE)

(72) Inventor: Werner Krammel, Bad Abbach (DE)

( * ) Notice: Subject to any disclaimer, the term of this patent is extended or adjusted under 35 U.S.C. 154(b) by 0 days.

(21) Appl. No.: 15/033,872

(22) PCT Filed: Dec. 2, 2014

(86) PCT No.: PCT/EP2014/076222
§ 371 (c)(1),
(2) Date: Oct. 27, 2016

(87) PCT Pub. No.: WO2015/113677
PCT Pub. Date: Aug. 6, 2015

(65) Prior Publication Data
US 2017/0043805 A1    Feb. 16, 2017

(30) Foreign Application Priority Data

Jan. 29, 2014    (DE) .......................... 10 2014 101 087

(51) Int. Cl.
*B62D 9/02* (2006.01)
*B62K 5/10* (2013.01)
(Continued)

(52) U.S. Cl.
CPC ................ *B62D 9/02* (2013.01); *B60G 9/02* (2013.01); *B62D 21/183* (2013.01); *B62D 55/04* (2013.01);
(Continued)

(58) Field of Classification Search
CPC . B62D 9/02; B62D 55/04; B60G 9/02; B62M 27/02; B62M 2027/022
See application file for complete search history.

(56) References Cited

U.S. PATENT DOCUMENTS 4,020,914 A * 5/1977 Trautwein ............ B60G 21/007
180/15
4,632,413 A * 12/1986 Fujita ....................... B60G 3/01
280/124.103
(Continued)

FOREIGN PATENT DOCUMENTS

| FR | 2937000 A1 * | 4/2010 | ............... B62D 9/02 |
|----|--------------|--------|--------------------------|
| FR | 2946944 A1   | 12/2010 |                         |
| NL | 1005894 C2   | 10/1998 |                         |

OTHER PUBLICATIONS

First Office Action from German Patent Office in German with English translation, dated Oct. 16, 2014 for File No. 102014101087.6.

(Continued)

*Primary Examiner* — Drew J Brown
(74) *Attorney, Agent, or Firm* — Koppel, Patrick, Heybl & Philpott; Michael J. Ram

(57) ABSTRACT

A vehicle with a tilting frame comprises a main frame with at least one ground contacting element such as a wheel, skid, caterpillar chain or a float attached thereto. The vehicle can be steered by means of an axle pivot steering arrangement. The tilting frame, tiltable relative to the main frame, has a tilt axis with a steering tube having a steering axis running obliquely or perpendicularly to the tilt axis. Also provided are at least one track rod and a track rod actuation element characterized by the track rod actuation element being movable relative to the tilting frame. During cornering, by tilting the tilting frame about the tilt axis and, independently thereof, by rotation of the steering tube about the steering axis, the track rod causes the ground contact element to undergo a steering movement without a substantial changing in the camber of the steerable contact element.

15 Claims, 12 Drawing Sheets

(51) Int. Cl.
*B62D 21/18* (2006.01)
*B62K 5/01* (2013.01)
*B62K 5/05* (2013.01)
*B60G 9/02* (2006.01)
*B62D 55/04* (2006.01)
*B62M 27/02* (2006.01)

(52) U.S. Cl.
CPC ............... *B62K 5/01* (2013.01); *B62K 5/05* (2013.01); *B62K 5/10* (2013.01); *B62M 27/02* (2013.01); *B62M 2027/022* (2013.01)

(56) References Cited

U.S. PATENT DOCUMENTS

| | | | | |
|---|---|---|---|---|
| 4,887,829 A * | 12/1989 | Prince | ............... | B60G 21/05 180/215 |
| 6,382,646 B1 * | 5/2002 | Shaw | ............... | B62K 3/002 280/11.28 |
| 6,863,288 B2 * | 3/2005 | Van Den Brink | ... | B60G 21/007 280/124.103 |
| 7,487,985 B1 * | 2/2009 | Mighell | ............... | B62K 5/027 180/210 |
| 7,631,721 B2 * | 12/2009 | Hobbs | ............... | B60G 21/007 180/348 |
| 7,665,749 B2 * | 2/2010 | Wilcox | ............... | B60G 3/01 280/124.103 |
| 8,485,541 B2 * | 7/2013 | Pozio | ............... | B60G 3/20 280/124.107 |
| 8,607,913 B2 * | 12/2013 | Daniels | ............... | B62D 7/148 180/210 |
| 8,641,064 B2 * | 2/2014 | Krajekian | ............... | B62K 5/027 180/210 |
| 8,651,503 B2 * | 2/2014 | Rhodig | ............... | B60G 21/00 280/124.103 |
| 8,777,242 B1 * | 7/2014 | Cheng | ............... | B60G 9/02 180/210 |
| 9,114,844 B2 * | 8/2015 | Walter | ............... | B62K 13/04 |
| 2003/0102176 A1 * | 6/2003 | Bautista | ............... | B60G 21/007 180/210 |
| 2005/0206101 A1 * | 9/2005 | Bouton | ............... | B60G 21/007 280/6.154 |
| 2006/0255550 A1 * | 11/2006 | Pfeil | ............... | B60G 21/007 280/5.509 |
| 2007/0151780 A1 * | 7/2007 | Tonoli | ............... | B60G 17/015 180/65.1 |
| 2007/0176384 A1 * | 8/2007 | Brudeli | ............... | B60G 21/007 280/124.103 |
| 2007/0182120 A1 * | 8/2007 | Tonoli | ............... | B60G 17/015 280/124.142 |
| 2008/0012262 A1 * | 1/2008 | Carabelli | ............... | B60G 7/006 280/124.106 |
| 2008/0100018 A1 | 5/2008 | Dieziger | | |
| 2008/0197597 A1 * | 8/2008 | Moulene | ............... | B60G 21/007 280/124.103 |
| 2008/0238005 A1 * | 10/2008 | James | ............... | B62D 9/02 280/5.509 |
| 2008/0258416 A1 | 10/2008 | Wilcox | | |
| 2013/0168934 A1 | 7/2013 | Krajekian | | |

OTHER PUBLICATIONS

Second Office Action from German Patent Office in German with English translation, dated Dec. 1, 2015 for File No. 102014101087.6.

International Search Report, PCT/EP2014/076222 dated Feb. 23, 2015.

* cited by examiner

VEHICLE WITH TILTING FRAME

BRIEF DESCRIPTION AND BACKGROUND

The invention relates to a vehicle having a main frame on which there is fixed at least one contact element, in particular a wheel, a skid, a caterpillar track or a float, which can be steered by means of an axle pivot steering arrangement, having a tilting frame which is tiltable relative to the main frame by a driver and has a tilt axis, having a steering tube which has a steering axis running obliquely or perpendicularly to the tilt axis, having at least one track rod, and having at least one track rod actuation element.

In particular, on the vehicle the steering tube is likewise tiltable relative to the main frame.

In connection with the invention disclosed in the present application the term "track rod" includes any configuration of a steering transmission element with which a movement of the track rod actuation element is transmitted to the axle pivot steering arrangement of the steerable contact element.

As a precaution it is to be pointed out that in the present case the term "axle pivot steering arrangement" also includes hub centre steering arrangements such as are used, for example, in individual cases on motorcycles.

The track rod actuating element is arranged functionally—in a steering gear—between the steering tube and track rod and transmits a steering movement caused by the driver to the track rod(s), as a result of which the direction of travel of the vehicle is changed via the at least one steerable contact element.

In a vehicle of such configuration the driver can lean, together with the tilting frame, into the curve during driving without the camber of the steerable contact element or the steerable contact elements changing or changing substantially, as is triggered by the steering movement during cornering. Slight changes in camber due to the chassis kinematics are of course nevertheless possible.

If the contact elements are, for example, wheels, and for example fixed via an individual wheel suspension on the main frame with king pin inclination, i.e. a not quite vertical axis, a negligible change in the camber takes place when the wheels are steered in due to the chassis kinematics.

The camber moreover also changes negligibly due to compression and rebound.

A substantial change in the camber during steering into the curve, such as e.g. at an angled position when riding a motorcycle, and an associated reduction in the tyre contact area and in the adhesion between tyre and ground does not take place.

By construction of a tilting frame which is tiltable by a driver relative to a main frame on which the contact elements are fixed, the tilting frame can be tilted by the driver towards the inside of the curve according to the curve radius and the curve speed and thus against the centrifugal force.

By this means on the one hand a substantially more comfortable seating position for the driver is achieved, since he can lean into the curve together with the tilting frame and furthermore the centre of gravity is displaced inwards not only by the weight of the driver, but also by the tilting frame and all the attachments, as a result of which the risk of the vehicle overturning is reduced significantly.

By the feature that the wheels and/or skids are fixed on the main frame such that the camber does not change or changes only negligibly when steering into the curve a maximum contact area between tyre and ground when cornering is also maintained with tyres having a substantially flat tread. Maintaining the maximum contact area between tyre and ground when cornering on the one hand significantly increases safety, since more frictional area is available between tyre and ground. On the other hand the full tread is also available when cornering, as a result of which the tread, which has been optimised by the tyre manufacturer, is also completely available for the drive in the curve.

By the feature that contact elements are fixed on the main frame and a contact element is rotatable and therefore steerable relative to the main frame via a steering arrangement, it is ensured that the advantages described above also apply to the wheels which are rotatable for changing the direction of travel. The wheels here rotate about an axis substantially perpendicular to the direction of the vehicle, so that the camber remains virtually unchanged.

By this construction the main frame with the contact elements arranged thereon is aligned substantially parallel to the surface of the roadway covering, it being possible for the tilting frame with the driver to lean inwards, depending on the curve speed and curve radius. By this means a sensation as when motorcycle riding arises, substantially higher curve speeds being possible due to the contact elements which do not tilt into the curve. The chassis, formed from the main frame and the contact elements arranged thereon, allows a faster and safer cornering because of the maximum contact area between the contact element and roadway covering. Furthermore, the chassis brings about improved drive and braking properties in the curve.

In sloping terrain, such as, for example, in hilly countryside and in the mountains, the vehicle has a particular advantage, since even during travel on a slant relative to the direction of inclination of the terrain, for example travel diagonally uphill or downhill, a relatively comfortable vertical or at least upright sitting position can still be assumed via the tilting frame.

A vehicle having such a construction is known from US 2010/0320023 A1. The drive unit is connected to the main frame in a fixed manner. Due to the high arrangement of the drive combined with the high centre of gravity of the drive, the tendency of the vehicle to overturn when cornering is not substantially reduced.

U.S. Pat. No. 7,946,371 discloses a snowmobile in which the vehicle body including the engine and drive can tilt into the curve relative to the front chassis. The aim here is that the skis attached to the chassis do not run on the edges when cornering.

U.S. Pat. No. 2,643,897 discloses a connecting means between a car body and the wheels, which is said to avoid swaying of the vehicle on an uneven or sloping road.

US 2008/0100018 A1 describes a vehicle suspension system in which the wheels, the passenger section and where appropriate the boot are tiltable relative to the engine and drive section, including the vehicle's suspension.

NL000001005894C discloses a vehicle having a tilting frame which is pivotable horizontally about a vertical pivot axis which is fixed on a main frame and on which track rods to two steerable wheels are fixed. Actuation of the track rods is via rotation of a steering column of the tilting frame, which is fixed to the main frame via a joint. On rotation of the steering column the tilting frame pivots horizontally about the pivot axis, as a result of which the track rods are likewise shifted horizontally in the pivoting direction and cause steering in of the steerable wheels. This complex steering mechanism generates a righting moment on the steering column via the tilting frame during cornering, but not on the tilt of the tilting frame. Tilting of the tilting frame alone brings about no steering movement on the steerable wheels.

BRIEF DESCRIPTION OF THE DRAWINGS

The invention is explained in more detail in the following with the aid of examples shown in the drawings. The drawings show, in each case in diagram form.

DETAILED DESCRITION

Figure 1:
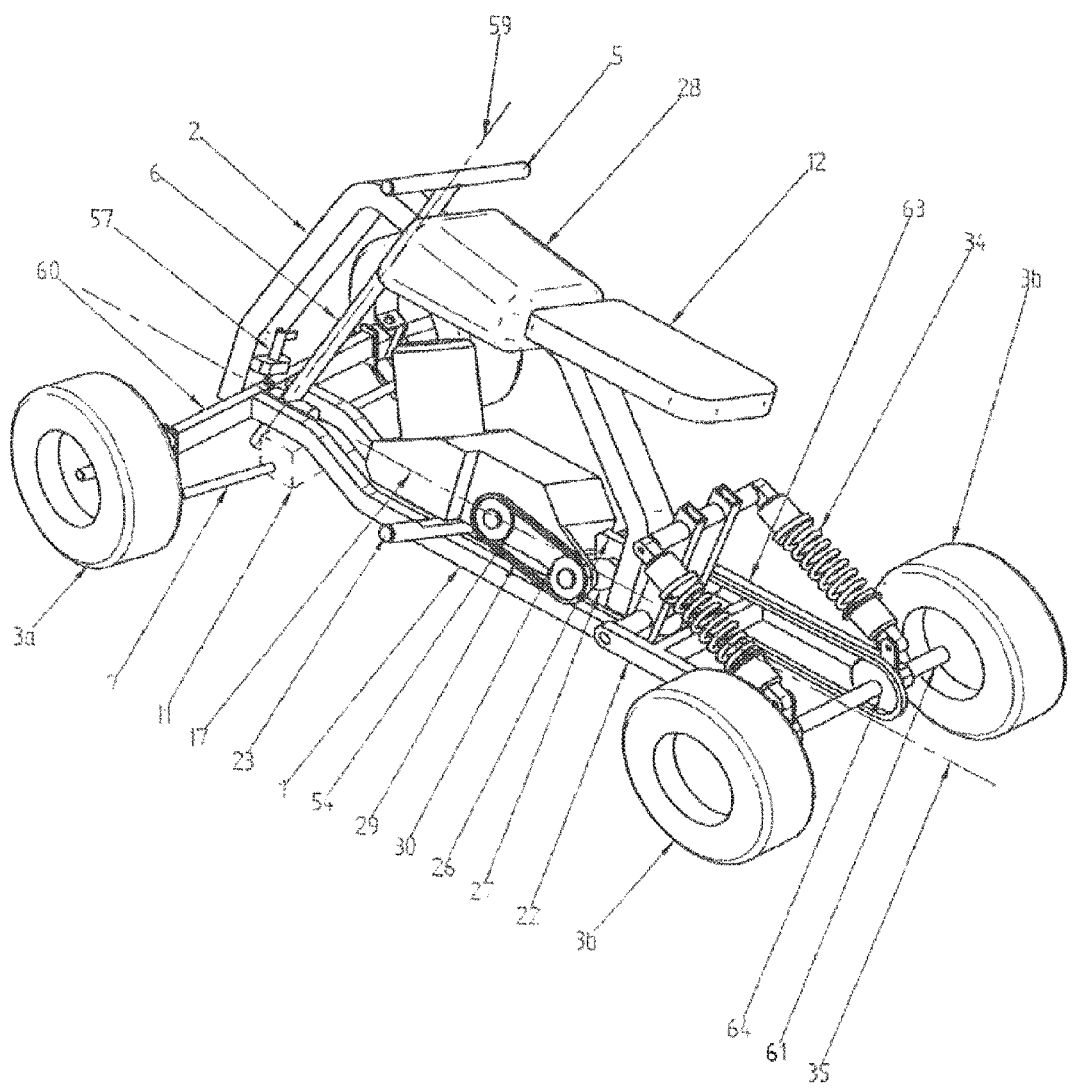
FIG. 1 a perspective view of an example of a four-wheeled vehicle according to the invention, FIG. 2 in perspective view a first example of a steering mechanism of a vehicle according to the invention, FIG. 3 a section through the steering mechanism according to FIG. 2 along the plane A drawn in FIG. 2, FIG. 4 in perspective view a second example of a steering mechanism of a vehicle according to the invention, FIG. 5 a section through the steering mechanism according to FIG. 4 along the plane B defined in FIG. 4, FIG. 6 in perspective view a third example of a steering mechanism of a vehicle according to the invention, FIG. 7 a section through the steering mechanism according to FIG. 6 along the place C defined in FIG. 6, FIG. 8 in perspective view a fourth example of a steering mechanism of a vehicle according to the invention, FIG. 9 a section through the steering mechanism according to FIG. 8 along the plane D defined in FIG. 8, FIG. 10 a perspective view of an example of a vehicle according to the invention constructed as a snowmobile, FIG. 11 a perspective view of an example of a three-wheeled vehicle according to the invention, and FIG. 12 a perspective view of a further example of a three-wheeled vehicle according to the invention.

Finally FR 2 946 944 A1 is also to be mentioned, which likewise discloses a vehicle with tilting technology and a steering mechanism of very complex configuration with a plurality of pulleys.

The invention is based on the object of providing a vehicle having a tilting frame for reducing the tendency to overturn, which has an improved steering arrangement.

This object is achieved by a vehicle having the features of claim 1. Advantageous embodiments of the invention are described in the dependent claims. The disclosure content of all the claims is included in the description herewith by reference.

The vehicle according to the invention is distinguished in that on tilting of the tilting frame around the tilt axis in the curve direction, that is to say when the driver leans into the curve, and independently thereof on rotation of the steering tube about the steering axis in the curve direction, the at least one track rod is actuated via a steering gear such that the at least one steerable contact element undergoes a desired steering movement into the curve direction without this resulting in a change in the camber of the contact element during cornering.

In a vehicle according to the invention at least one track rod actuation element is arranged in the steering gear movably relative to the tilting frame.

The direction of travel of a vehicle according to the invention is changed by a steering tube moving the at least one track rod actuation element either by rotation about a steering axis or by tilting about a tilt axis, and thus causing a shift in the track rod(s). A rotation of the steering tube here has no effect on the position of the tilting frame relative to the main frame. The camber of the steerable contact element does not change either due to tilting of the tilting frame or due to rotation of the steering tube. The camber of the steerable contact element consequently remains substantially unchanged during cornering.

Such a steering mechanism ensures that the at least one steerable contact element is rotatable relative to the main frame and nevertheless does not tilt or tilts only negligibly with the tilting frame during cornering.

The steering mechanism furthermore provides the particular advantage that a castor of the at least one steerable contact element in causes a righting moment, when this is steered in, on the tilting frame and at the same time on the steering tube and the associated rotational steering arrangement.

This generates for the driver in the curve during cornering a recoupling of the steering forces to the tilting frame and to the steering wheel or the handlebar. He can moreover operate the steering wheel or the handlebar to correct the cornering and/or change the tilt of the tilting frame by intensifying or reducing the cornering position.

In addition, the righting moment (self-aligning moment) has the effect of stabilising the steering arrangement and the entire vehicle during straight line travel.

The righting moment depends on the castor angle of the at least one steerable contact element. As the castor angle increases the righting moments and the associated righting forces acting on the tilting frame and steering tube become greater. In an advantageous embodiment of the vehicle the axle pivot steering arrangement of the at least one steerable contact element is configured such that the castor angle is variable and therefore can be adjusted to the requirements of different drivers.

As the driving speed increases, the righting forces become greater and have a stabilising effect during straight line travel.

In an advantageous embodiment of a vehicle according to the invention the track rod actuation element is arranged both at a distance from the tilt axis and at a distance from the steering axis.

By changing these distances the influence of a tilting of the tilting frame and the influence of a rotation of the steering tube on the steering angle can be changed.

In an advantageous embodiment of a vehicle according to the invention the track rod actuation element is arranged movably in a guide element fixed to the tilting frame. In this guide element the track rod actuation element can be actuated by rotation of the steering tube. Independently thereof, on tilting of the tilting frame the guide element, and with this the track rod actuation element, is moved relative to the main frame such that the track rods are actuated.

In another advantageous embodiment of a vehicle according to the invention the track rod actuation element is arranged movably in a guide element fixed to the main frame. In this guide element the track rod actuation element can be actuated by tilting of the tilting frame and independently thereof by rotation of the steering tube.

In yet another advantageous embodiment of a vehicle according to the invention the track rod actuation element is fixed to the steering tube at a distance from the tilt axis and at a distance from the steering axis, so that this can be actuated by tilting of the tilting frame and independently thereof by rotation of the steering tube.

In an advantageous embodiment of a vehicle according to the invention the steering tube is coupled to the tilting frame such that on tilting of the tilting frame it automatically also tilts. For this, the steering tube can be connected to the tilting frame in a fixed manner, so that it tilts in the same angle as the tilting frame, but it can also be fixed elsewhere on the vehicle and coupled to the tilting frame via a suitable mechanism such that during tilts of the tilting frame the steering tube also tilts relative to the main frame.

The steering axis and the tilt axis do not have to lie in a common plane, but can also be spaced apart from one another.

In a preferred embodiment of a vehicle according to the invention this has a main frame and a tilting frame which can be tilted by a driver to the left and right relative to the main frame in the direction of travel, wherein

- at least two contact elements are arranged on the main frame and at least one of these can be rotated, by means of the steering arrangement described above, about an axis relative to the main frame for changing the direction of travel,
- at least one sitting or standing area for the driver is fixed to the tilting frame,
- a steering wheel or a handlebar or the like is fixed to the steering tube,
- a drive unit is accommodated in the tilting frame, and
- to bridge a tilting movement between the tilting frame and the main frame and to transmit a driving moment from the drive unit in the tilting frame to a drive element, for example a drive wheel or drive pinion, a part-turn gearbox is provided in the main frame.

The part-turn gearbox (also Pivoting or swivel-Gearbox) preferably has at least one ball drive joint.

In order to increase the tilting mobility of the part-turn gearbox, two ball drive joints can preferably also be provided in the part-turn gearbox.

By the arrangement of the drive unit in the tilting frame more mass is moved with the tilting frame, as a result of which the tendency to overturn in the curve is reduced. The drive unit can be configured as a combustion engine, electric motor or also as a simple pedal drive.

According to a preferred embodiment of a vehicle according to the invention, a drive wheel or drive pinion is provided for this on the gearbox in the tilting frame parallel to the tiltable plane of the tilting frame and on the ball drive joint of the part-turn gearbox a swivel wheel or swivel pinion is provided, which is connected to the drive wheel or pinion via a power transmission means. As a rule a chain or a toothed belt is used as the power transmission means. The power transmission means and the swivel wheel or pinion of the part-turn gearbox are also arranged in the same plane as the drive wheel or drive pinion.

By the construction of the drive wheel or drive pinion parallel to the tiltable plane of the tilting frame, a power transmission from the tilted tilting frame via the part-turn gearbox to the wheels is rendered possible without an uprighting moment of the drive wheel or drive pinion being generated on the tilting frame. This is of decisive importance since, for example, when the gearbox is connected via a cardan shaft aligned in the direction of travel to the rear drive axle a moment would be generated on the tilting frame during acceleration and braking and the driver would have to control this additionally during acceleration and braking. By the arrangement of the drive wheel or pinion in a plane parallel to the plane of the tiltable frame and the part-turn gearbox no uprighting moment acts on the tilting frame during acceleration and braking, so that this is neither pulled up nor forced down during acceleration and braking.

Thus only forces in the direction of travel and no torque axis in the direction of travel act during acceleration and braking.

According to a further preferred embodiment of a vehicle according to the invention the tilting frame is connected to the main frame via bearing units with a tilt axis in the direction of travel. The tilt axis can be realised via a swivel joint directly on the main frame or alternatively a crank guide can also be provided as a bearing unit between the main frame and tilting frame, so that the tilt axis is virtually arranged outside the main frame, for example on the roadway surface.

By lowering the tilt axis between the tilting frame and main frame a further reduction in the risk of overturning when cornering rapidly and also a better road holding are achieved.

The tilt axis is always chosen such that even during extreme cornering the gravitational and centrifugal force of the tilting frame and the driver falls on to the ground surface, being spread through the wheels or skids.

The invention is suitable in particular for four-wheeled and three-wheeled vehicles. The invention is equally suitable for a snowmobile with a drive caterpillar and at least one skid for controlling, just as for an aquatic vehicle with a drive turbine or propeller and at least one float for controlling.

A vehicle according to the invention can equally be configured as a two-wheeler, in which a tilting frame is configured tiltably relative to a main frame and has hub centre steering with a castor angle.

A vehicle according to the invention with all-wheel steering, in which both on the front axle and on the rear axle the contact elements have axle pivot steering arrangements which are actuated via rotation of the steering tube or tilting of the tilting frame is equally conceivable.

The contact elements of a vehicle according to the invention which are steerable by means of an axle pivot steering arrangement can be provided with suspension in the conventional manner via shock absorbers and wishbones.

A vehicle according to the invention can comprise a locking means for the tilting frame so that this can be locked relative to the main frame as required.

In all the embodiments described above for a vehicle according to the invention and in all the examples described below the tilting axis can advantageously be fixed relative to the main frame. "Fixed" in the present connection means that the tilt axis can be suspended on the main frame in a partially or completely sprung manner or can be mounted on the main frame in an exactly fixed manner.

The action mechanism with which both a rotation of the steering tube and a tilting of the tilting frame act independently of one another on the track rod actuation element without a rotation of the steering tube having a direct effect on the position of the tilting frame relative to the main frame and without a tilting of the tilting frame having a direct effect on the rotational position of the steering tube is essential to the invention.

A vehicle according to the invention can have a steering gear with the properties described above on a front axle and/or on a rear axle.

With a vehicle according to the invention, during cornering with a tilted tilting frame the steering in of the steerable contact elements can be changed via the steering tube at any moment and in this way adapted to the driving situation.

In a vehicle according to the invention it is conceivable that in each case a steering gear and steerable contact elements are provided on the vehicle on the front and on the rear in order to render possible an all-wheel steering. In this connection it is also conceivable that, for example, at the front a steering takes place by rotating the steering tube and tilting the tilting frame—as described above—and at the rear only a steering by tilting the tilting frame takes place.

Further advantageous embodiments and advantages of the invention emerge from the dependent claims and the following descriptions of various examples.

In the following, elements of the example having the same function which span figures are given the same reference symbols and are not explained separately for each figure.

The reference symbols designate the elements of the various examples as stated in the list of reference symbols, which is also included in the description herewith by reference.

All the examples described below for vehicles according to the invention have the common feature that due to the castor angle γ of an axle pivot steering arrangement a righting moment and therefore righting forces act on the steering arrangement and tilting frame. These righting forces are advantageously individually adjustable by variation of the castor angle γ.

FIG. 1 shows in perspective view a vehicle having a main frame 1 having a front axle 60 and a rear axle 61 and a tilting frame 2 which is rotatably mounted on the main frame 1 and can be tilted relative to this by a driver, in particular during cornering.

On the front axle 60 and the rear axle 61 of the main frame 1 there are provided in each case two wheels as contact elements 3a, 3b, wherein the two front wheels 3a are arranged rotatably relative to the main frame 1 on in each case a stub axle and serve to control the vehicle. The front wheels 3a are rotatable about a substantially vertical or almost vertical axis and the camber angle remains almost unchanged during cornering.

The vehicle is thus a so-called quad bike which is popularly used as a recreational vehicle or in the countryside.

A sitting area 12, a handlebar 5 and a steering tube 6 connected thereto and foot rests 23 are arranged on the tilting frame 2. The steering tube 6 is mounted rotatably in the tilting frame 2 and consequently tilts simultaneously with a tilting of the tilting frame 2.

In the vicinity of the front axle 60 a steering gear 11 is arranged below the main frame 1, and includes a track rod actuation element 39 (cf. FIGS. 2 to 9).

The track rod actuation element 39 is coupled mechanically within the steering gear 11 to the tilting frame 2 and to the steering tube 6 such that this can be actuated by rotation of the steering tube 6 and independently thereof by tilting of the tilting frame 2. Four different examples of such a steering gear 11 are explained in more detail below in connection with FIGS. 2 to 9. The steering gear 11, however, can also be constructed in a different concrete embodiment according to the invention to that shown in the examples.

To control the vehicle the front wheels 3a are rotatable relative to the main frame 1 about the stub axle 4. Such a rotational movement of the front wheels 3a is generated by a movement of the track rod actuation element 39 due to rotation of the steering tube and/or tilting of the tilting frame 2 being transferred to the front wheels 3a via track rods 7, which are coupled to the track rod actuation element 39, on the knuckle arm 13 of wheel mounts 46 (see FIG. 2).

The front wheels 3a are fixed on the main frame 1 via a so-called single-wheel suspension, which can include spring damper elements and wishbones.

In the tilting frame 2 an energy storage device 28, a drive unit 17 and a part-turn gearbox 26 are provided. The drive unit 17 is, for example, a combustion engine and the energy storage device 28 is, for example, a fuel tank which supplies the combustion engine with the necessary fuel.

Accommodating the energy storage device 28, the drive unit 17 and the part-turn gearbox 26 in the tilting frame has the advantage that substantially more weight can be tilted inwards during cornering and therefore the road holding is improved and the risk of turning over is reduced significantly.

Transmission of power from the part-turn gearbox 26 to the rear wheels 3b takes place via a drive wheel or drive pinion 54, a power transmission means 29, as a rule in the form of a toothed belt or a chain, and a swivel wheel or swivel pinion 30, which is fixed on the part-turn gearbox 26.

The part-turn gearbox 26 has at least one ball drive joint 27, via which the swivel movement between the main frame 1 and tilting frame 2 is taken up.

In a preferred embodiment two ball drive joints 27 are configured in the part-turn gearbox 26. Via the ball drive joints 27 above all the torque for the drive is transmitted.

By the arrangement of the drive wheel or drive pinion 54, the power transmission means 29 and the swivel wheel or swivel pinion 30 in a plane parallel to the tilting frame 2, no moment of force acts in the direction of travel and therefore no laterally acting overturning moments arise on the tilting frame 2 during acceleration or during braking.

The part-turn gearbox 26 has a second swivel wheel or swivel pinion which is mounted in its axis in a fixed manner on the main frame 1. The second swivel wheel or swivel pinion is coupled via a second power transmission means 63, again in the form of a chain or a toothed belt, to a second drive wheel or drive pinion 64, which drives the rear axle 61 on which the wheels 3b are fixed.

In the embodiment shown the quad bike has a rigid rear axle 61 which can provide suspension relative to the main frame 1 via a spring suspension system 34. For this, the rear axle 61 is connected via an oscillating crank 22 to a swing axle which is provided on the main frame 1 and about which the rear axle 61 can move against the spring force in the spring suspension system 34.

So that the tilting frame 2 can tilt relative to the main frame 1, this is fixed via bearing units on the main frame 1, the axis of rotation of the bearing units, which represents the tilt axis 35 of the tilting frame 2, running in the direction of travel.

With the vehicle described in connection with FIG. 1, during cornering the driver can lean the tilting frame 2 together with the drive unit 17, part-turn gearbox 26 and energy storage device 28 into the curve, as a result of which a sensation as with motorcycle riding arises. By the quad bike with the steering arrangement described a significantly improved road holding, which allows faster cornering, and at the same time a recoupling of the steering forces to the swivel frame and steering arrangement as in cars are achieved.

The wheels 3a, 3b, the camber of which does not change or changes only negligibly on steering into the curve, take care of faster cornering. By this means a very good contact area between the wheels 3a, 3b and the ground is achieved in the curve, since the substantially flat tread of the wheels 3a, 3b remains substantially completely in contact with the roadway covering.

Furthermore, the driver can go to the limits of the vehicle very much without risk, since the risk of overturning is reduced significantly.

In a modification, not shown, of a vehicle according to the example of FIG. 1, the bearing units via which the tilting frame 2 is fixed on the main frame 1 are provided as crank guides, so that the tilting axis 35 is displaced from above the main frame 1 downwards, for example to the roadway surface. In this embodiment the tilting frame 2 tilts towards a circular track having an axis of rotation on the roadway surface. In this embodiment corresponding length compensation elements are provided in the part-turn gearbox 26.

In a further modification, not shown, of a vehicle according to the example of FIG. 1 instead of the rear drive a front drive with which the front wheels 3a are connected to the part-turn gearbox 26 via a drive shaft is used.

In yet further modifications, not shown, of a vehicle according to the example of FIG. 1 the drive unit is arranged on the oscillating crank 22 or in the main frame 1.

In the first example of a steering gear 11 shown in FIGS. 2 and 3, for example for a vehicles according to FIGS. 1 and 10 to 12 (see below), the track rod actuation element 39 is a toothed rack which is arranged movably in a guide element 40 constructed as a toothed rack guide sheath. The guide element 40 is fixed from the bottom to the tilting frame 2 at a distance from this, so that on tilting of the tilting frame 2 the track rod actuation element 39 is shifted about the tilt axis 35 transversely to the direction of travel. A steering tube 6 runs through the tilt axis 35 of the tilting frame 2 and has at a suitable distance below the tilt axis 35 a toothed wheel segment 38 which engages in the toothed rack and on rotation of the steering tune 6 shifts the track rod actuation element 39—here the toothed rack—within the guide element 40—here the toothed rack guide sheath.

A movement axis 47 of the track rod actuation element 39 accordingly has a distance 8 from the steering axis 59 and a distance 9 from the tilt axis 35.

Both on rotation of the steering tube 6 in the clockwise direction and on tilting of the tilting frame 2 in the clockwise direction (in each case viewed in the direction of travel) the track rod actuation element 39 and consequently also the track rods 7 are shifted to the left, viewed in the direction of travel, by means of the toothed wheel segment 38 or by means of the guide element 40, so that the front wheels 3a are rotated in the clockwise direction about their stub axle 4 and therefore undergo a steering movement to the right, viewed in the direction of travel. On rotation of the steering tube 6 in the counter-clockwise direction and also on tilting of the tilting frame 2 in the counter-clockwise direction the front wheels 3a undergo a steering movement to the left in an analogous manner.

Figure 2:
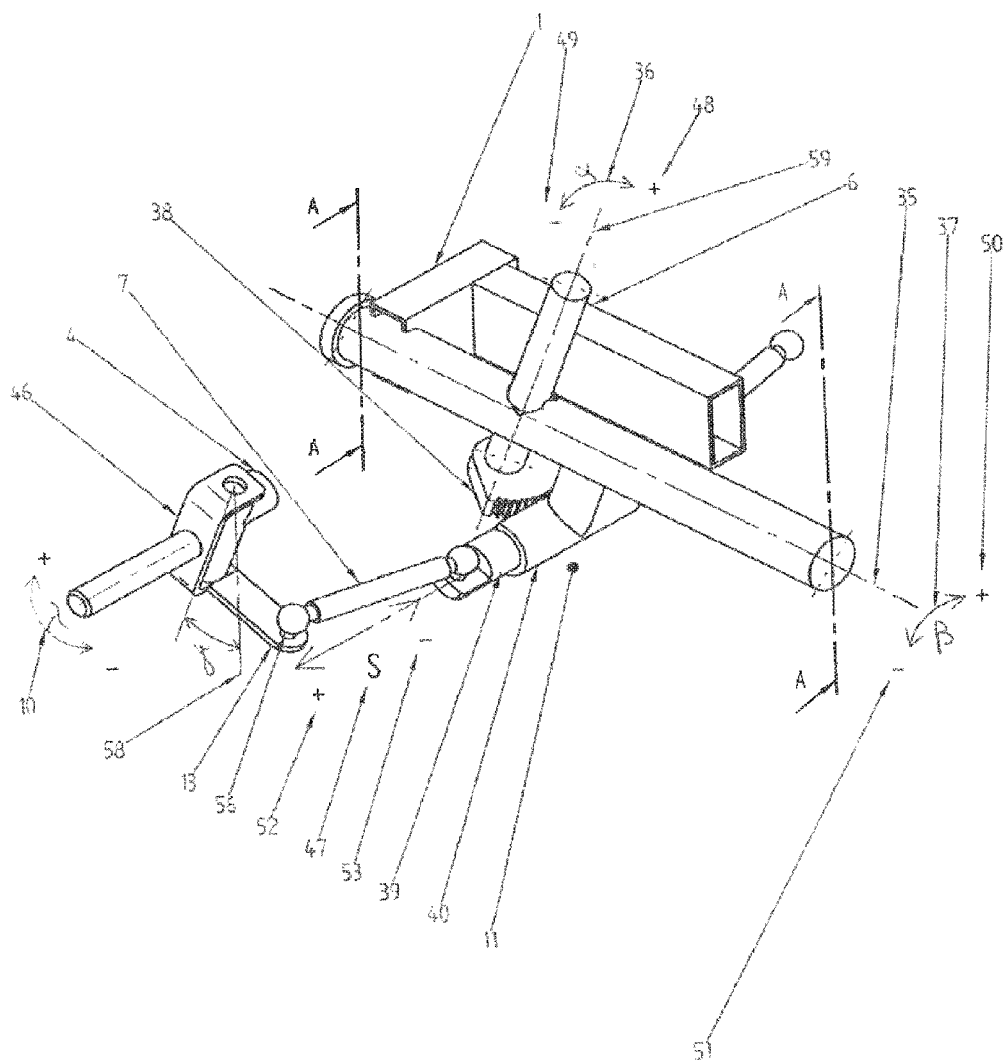
Figure 3:
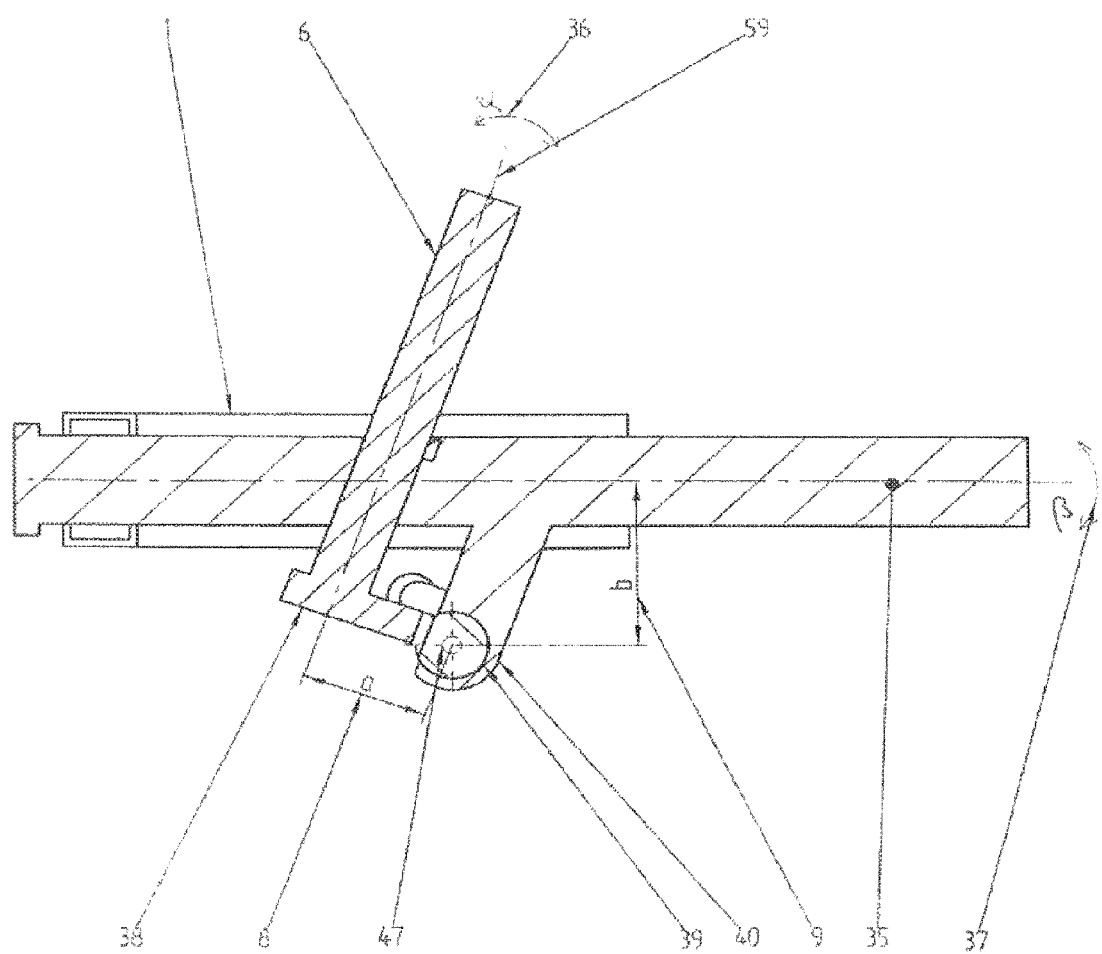
Figure 4:
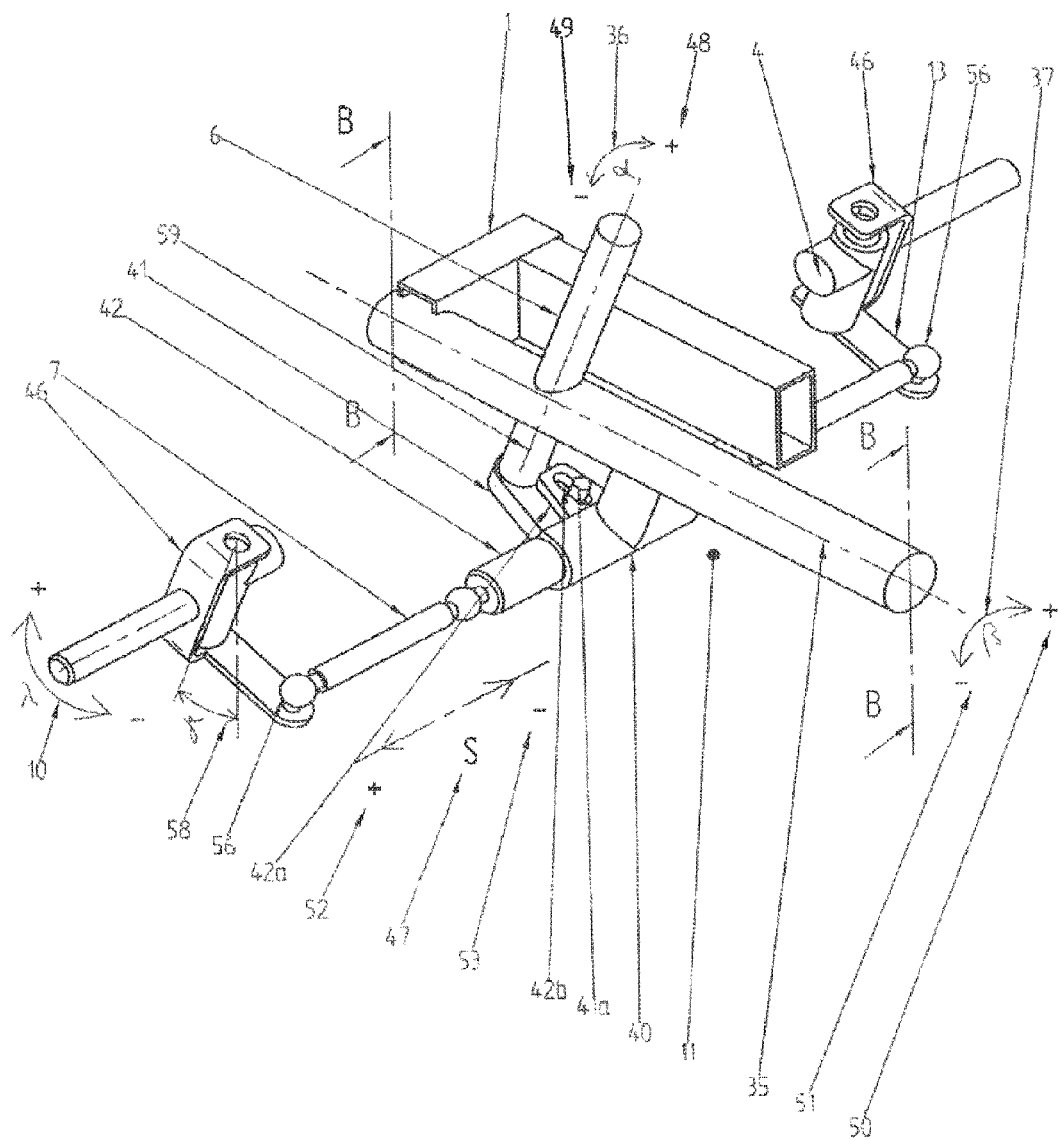
Figure 5:
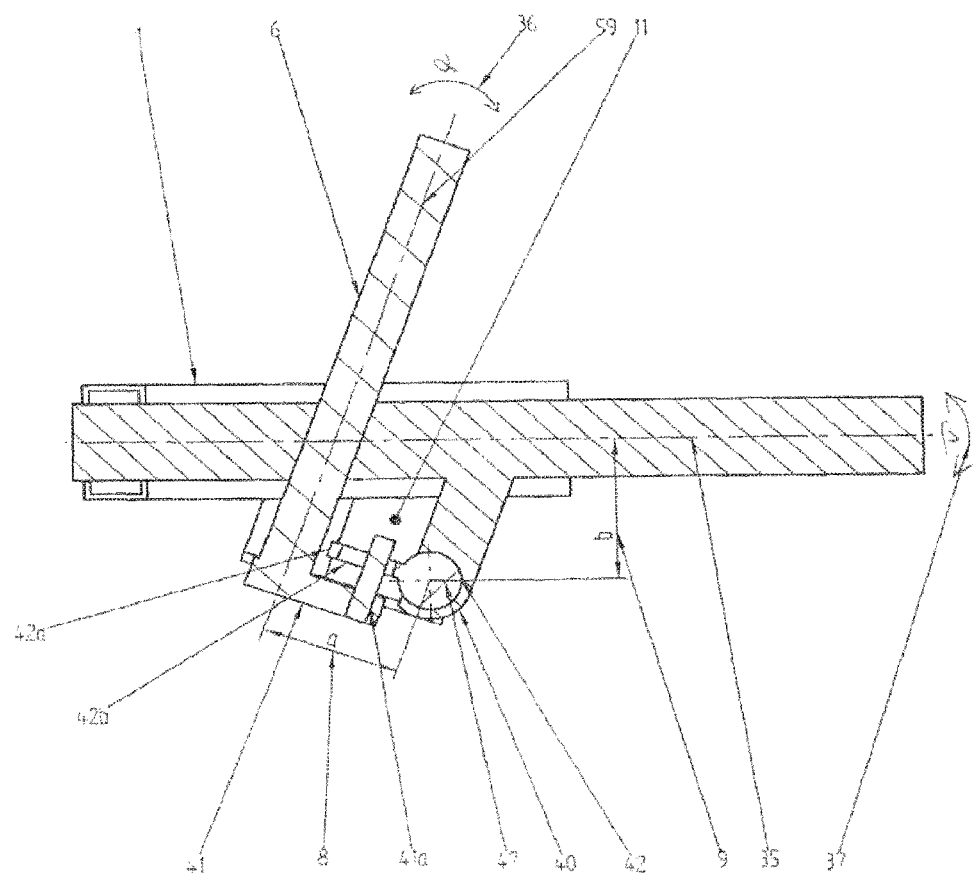

The second example of a steering gear 11 shown in FIGS. 4 and 5, for example for a vehicle according to FIGS. 1 and 10 to 12, differs from the first example of FIGS. 2 and 3 in particular in that as the track rod actuation element 39, instead of the toothed track a rod 42 is provided, which has laterally a tongue 42a with an elongated hole 42b, and in that instead of the toothed wheel segment 38 a steering arm 41 with a pin 41a, which engages in the elongated hole 42b of the tongue 42a, is provided.

In the third example of a steering gear 11 shown in FIGS. 6 and 7, for example for a vehicle according to FIGS. 1 and 10 to 12, the track rod actuation element 39 has a track rod drive crank 43 which is mounted horizontally displaceably by means of a crank guide pin 33 in a first elongated hole 24a, extending perpendicularly to the direction of travel, of a steering gear housing 24 arranged between the two front wheels below the tilt axis 35 and fixed on the main frame 1. The track rod drive crank 43 furthermore has a pintle 44 running in the direction of travel with a second elongated hole 43a extending in the direction of travel. A steering tube 6 runs through the tilt axis 35 of the tilting frame 2 and has underneath the tilt axis 35 at a suitable distance from this a steering arm 41 with a pin 41a, which engages in the elongated hole 43a of the track rod drive crank 43 and on rotation of the steering tube 6 shifts the track rod drive crank 43 within the steering gear housing 24 along the elongated hole 24a.

The track rods 7 of the two front wheels 3a are coupled to the track rod drive crank 43.

Both on rotation of the steering tube 6 in the clockwise direction and on tilting of the tilting frame 2 in the clockwise directions (in each case viewed in the direction of travel) the track rod drive crank 43 and consequently also the track rods are shifted to the left by means of the steering arm 41 with pins 41a, so that the front wheels 3a are rotated in the clockwise direction about their stub axle 4 and therefore undergo a steering movement to the right, viewed in the direction of travel. On rotation of the steering tube 6 in the counter-clockwise direction and on tilting of the tilting frame 2 in the counter-clockwise direction the front wheels 3a undergo a steering movement to the left in an analogous manner.

Figure 6:
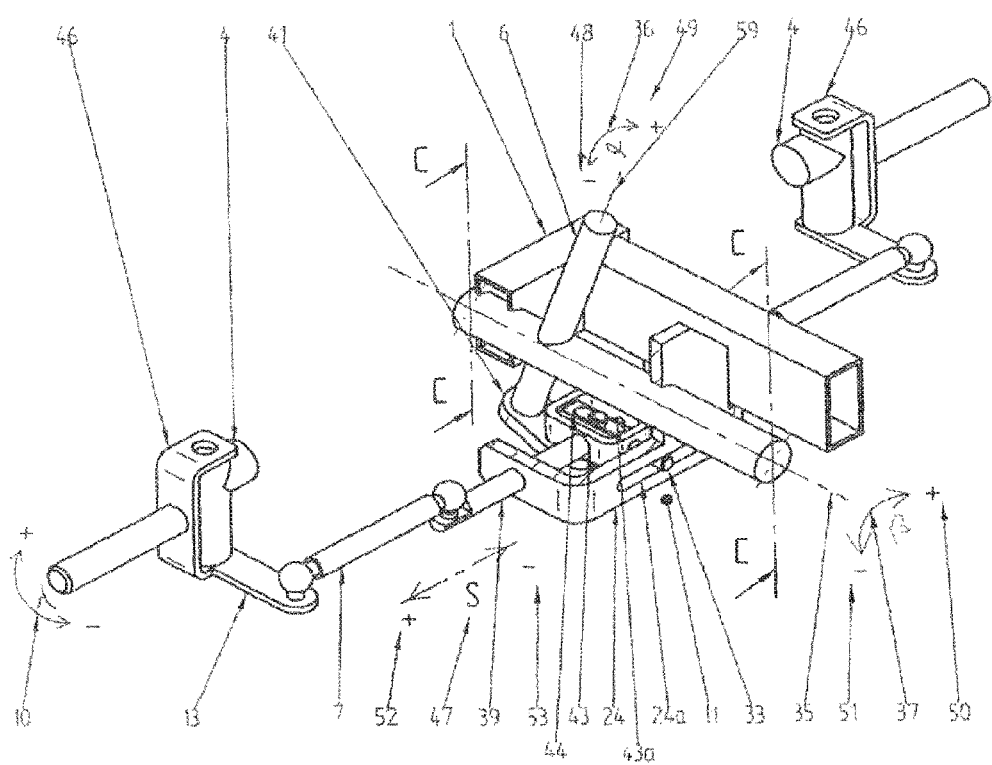
Figure 7:
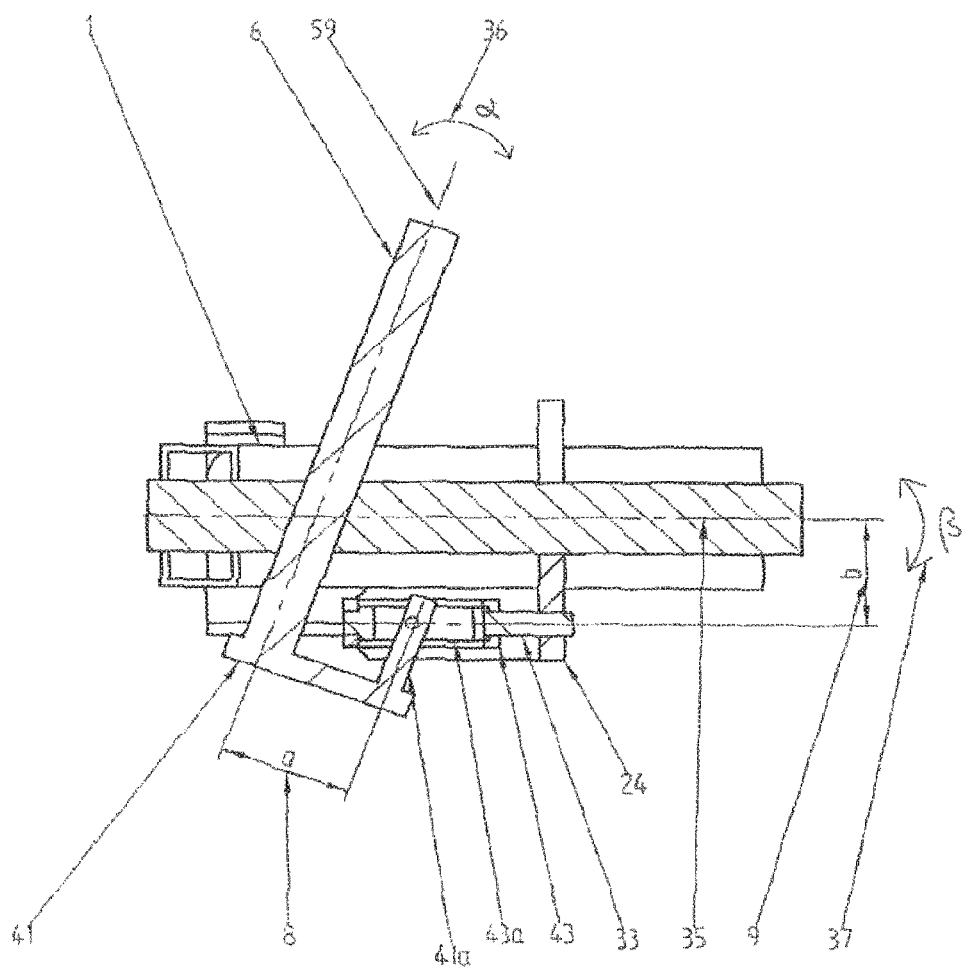
Figure 8:
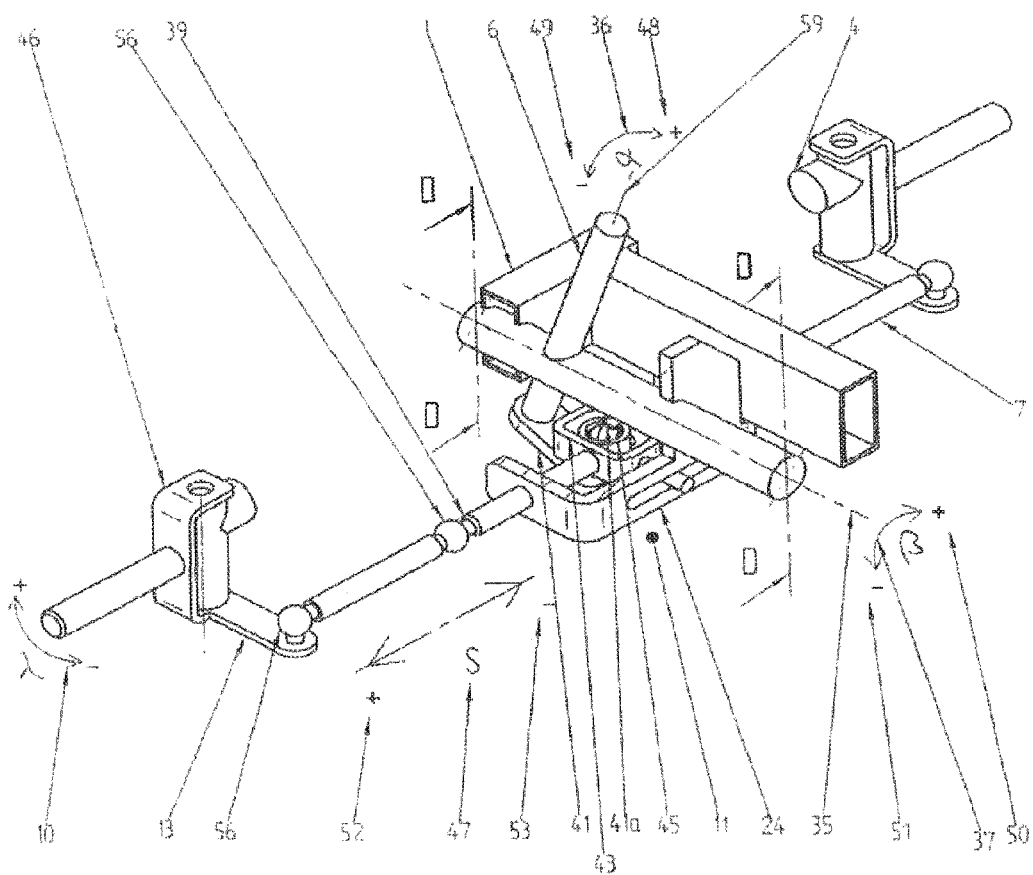
Figure 9:
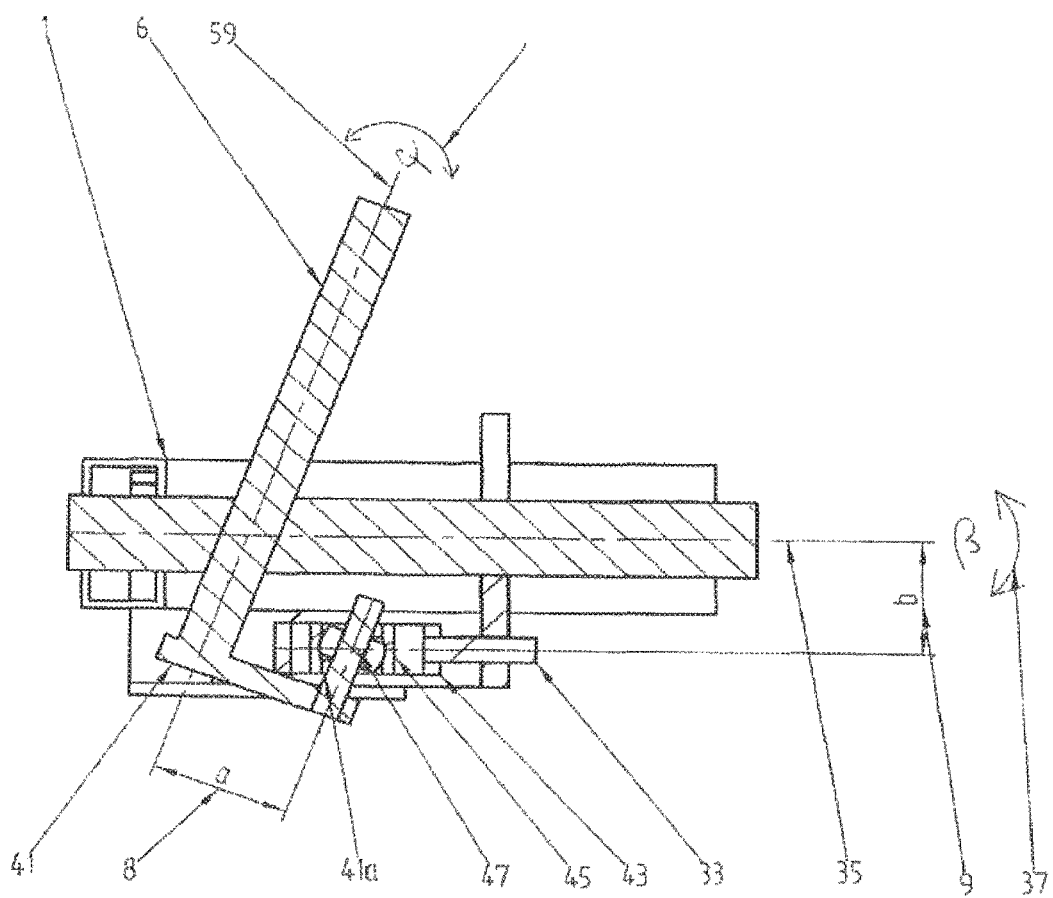

The fourth example of a steering gear 11 shown in FIGS. 8 and 9, for example for a vehicle according to FIGS. 1 and 10 to 12, differs from the third example of FIGS. 6 and 7 in particular in that in the track rod drive crank 43 instead of a pintle 44 a self-aligning ball bearing 45 is provided, into which the pins 41a of the steering arm 41 engage.

In all the examples explained above the steering axis 59 runs, by way of example, through the tilt axis 35, although this is not absolutely necessary. The steering axis 59, for example in the case of two-seater vehicles where the two seats are arranged side by side, viewed in the direction of travel, can run with a lateral displacement beside the tilt axis 35 and act on a steering gear 11 suitably arranged in the vehicle.

Figure 10:
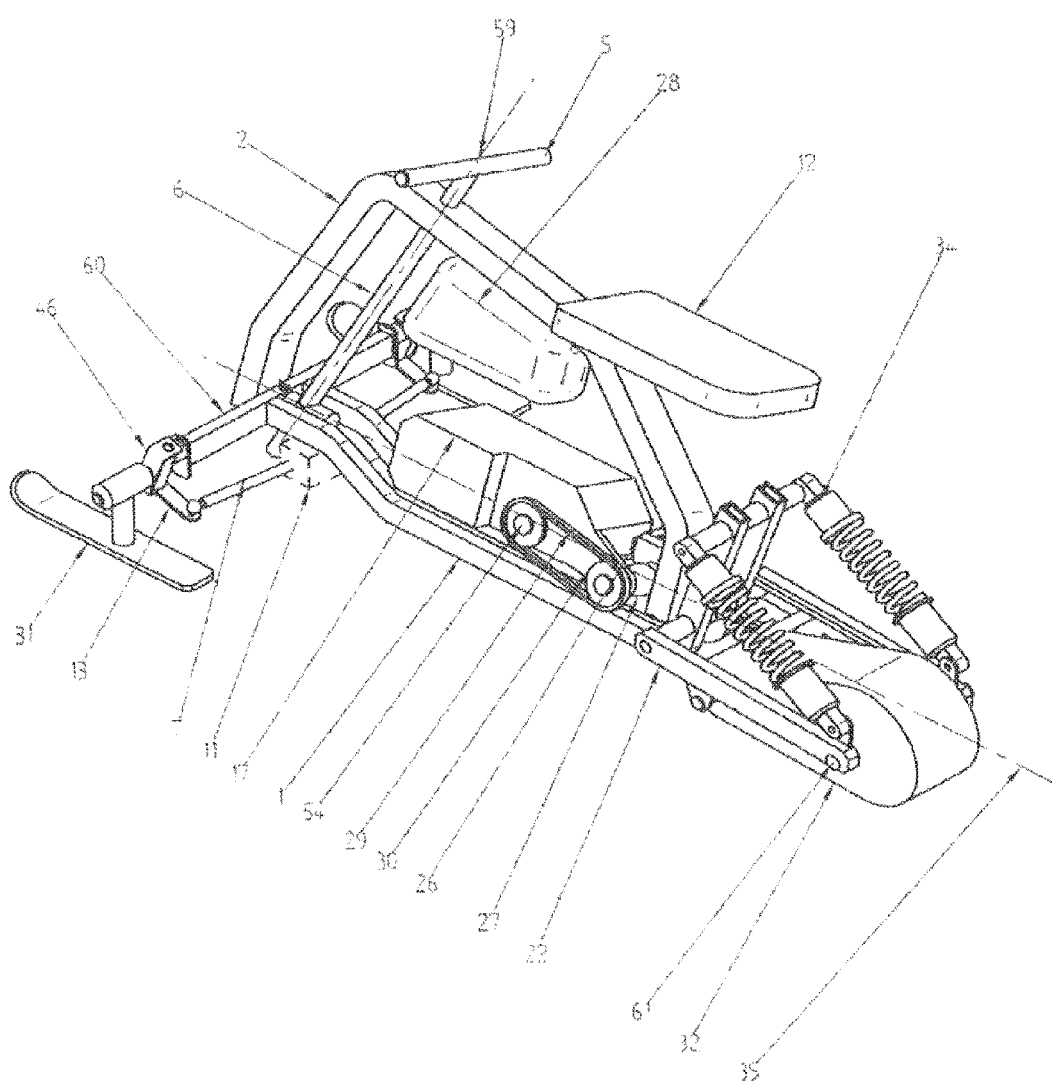

FIG. 10 shows an example for the construction of the vehicle as a snowmobile, wherein in contrast to the vehicle of FIG. 1 instead of the front wheels skids 31 are provided, which equally are steerable relative to the main frame 1. A drive caterpillar 32 is provided instead of the rear wheels.

On snowmobiles in particular it is important that these can be driven pleasantly in mountainous terrain, which is achieved by the tilting frame 2. Moreover, not only is an increased driving pleasure thus achieved by the faster possible cornering, an additional measure of safety is gained, since the driver can always keep the tilting frame 2 vertical, even when he is driving diagonally down or up a slope, and during cornering can displace the centre of gravity so far inwards that the overturning moment is reduced significantly.

Figure 11:
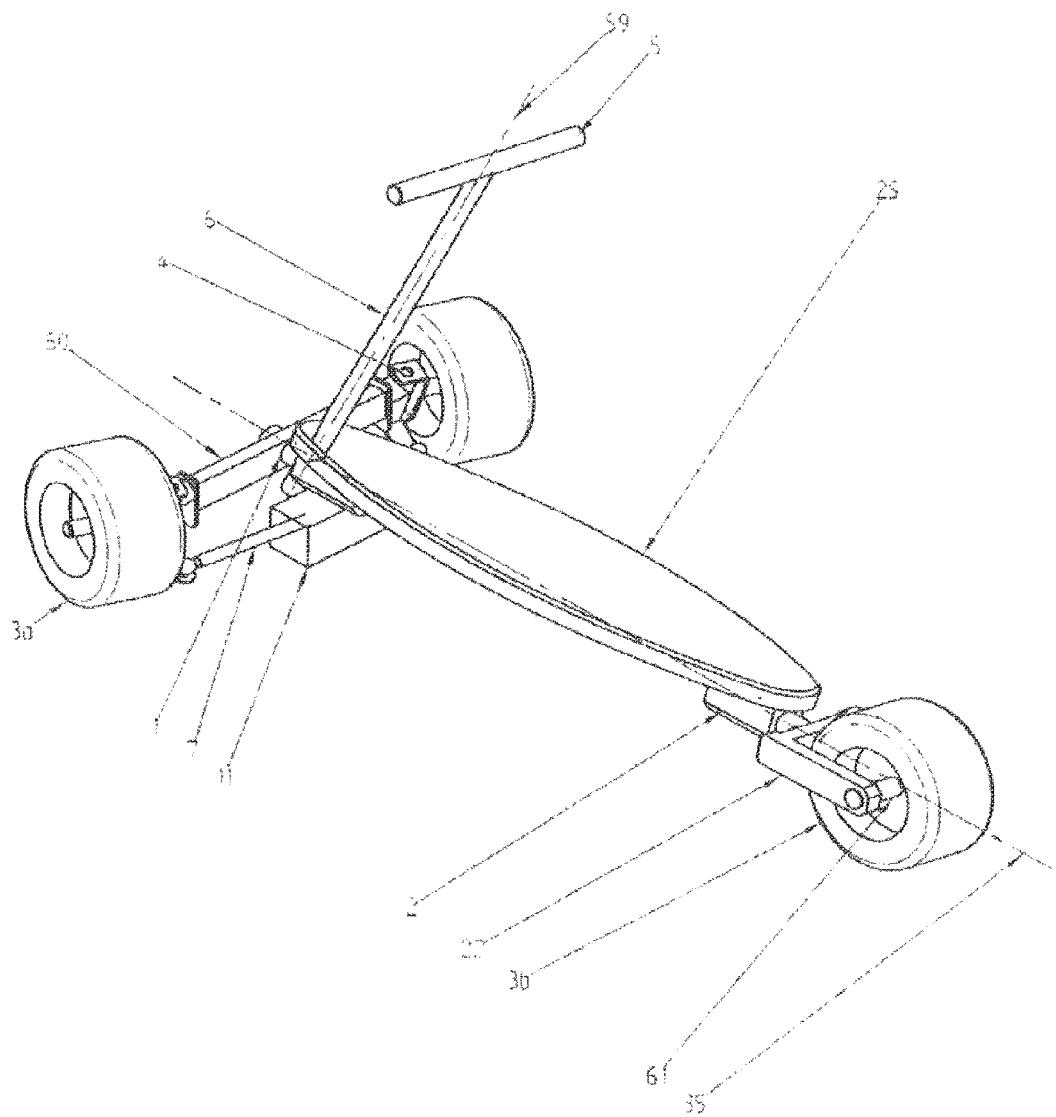

FIG. 11 shows an example for a three-wheeled vehicle having a main frame 1 and a tilting frame 2 which is tiltable relative to this and has a standing area 25. Two front wheels 3a are fixed on a front axle 60 and are rotatable via an axle pivot steering arrangement. A steering gear 11 which can be constructed, for example, according to one of the five examples explained above or in another embodiment according to the invention is arranged underneath the tilting axis 35.

The three-wheeled vehicle can be motorised or driven simply by foot.

Figure 12:
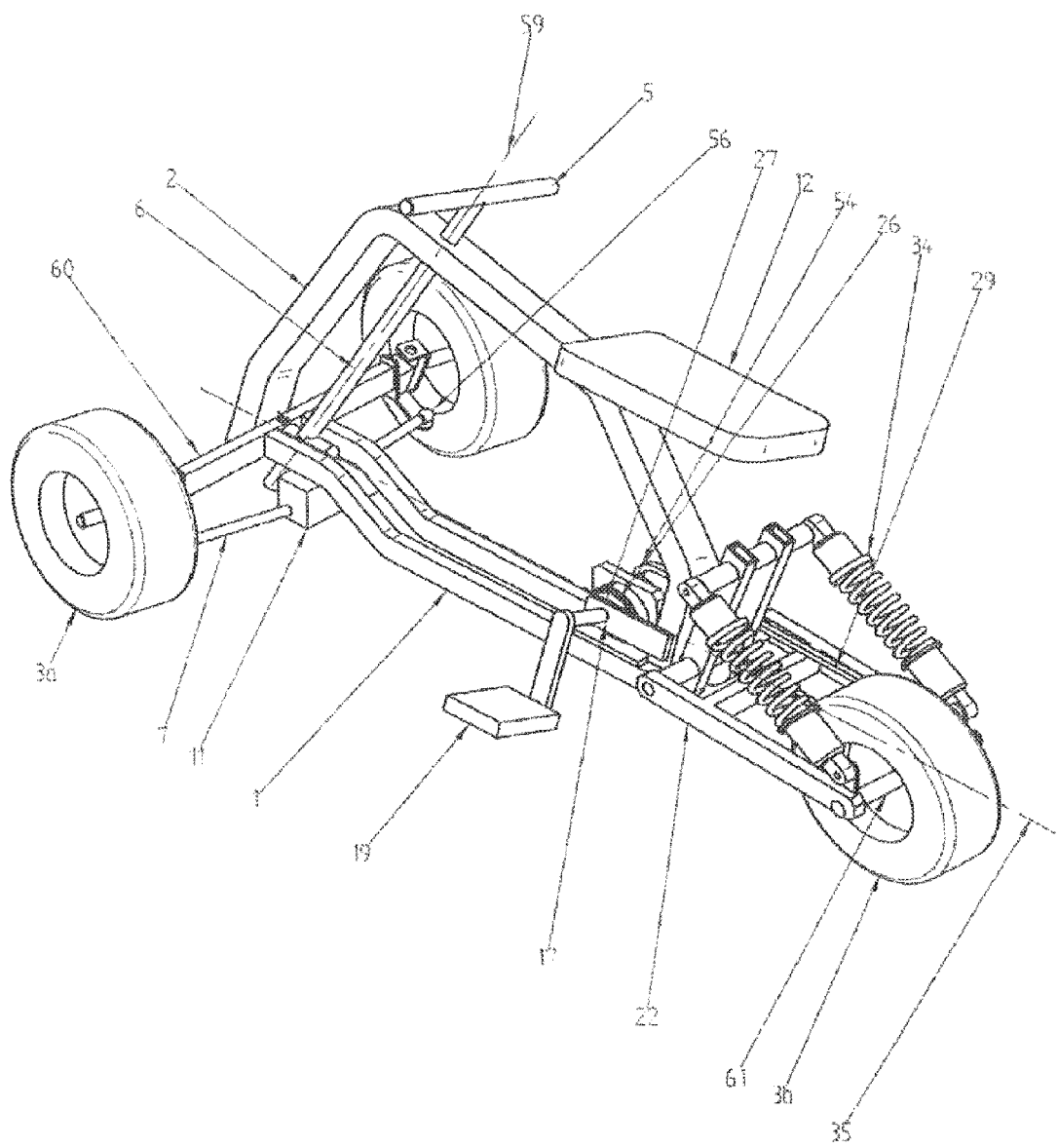

FIG. 12 shows a vehicle which differs from the vehicle described in connection with FIG. 1 substantially in that it is constructed as a three-wheeled vehicle and instead of two rear wheels only one rear wheel 3b is provided and instead of the combustion engine a pedal drive 19 is provided. The pedal drive 19 is fixed on the tilting frame 2, consequently tilts with this, and is coupled via a ball drive joint 27 to a drive wheel or drive pinion fixed on the main frame 1, rotation of which is transmitted via a power transmission element 29, for example a chain or a toothed belt, to a drive wheel on the rear axle 61.

In the construction according to FIG. 12 as a three-wheeled vehicle it is important in particular that the rear wheel 3b does not tilt with the tilting frame 2 in the curve, so that an optimum transmission of energy is achieved between the rear wheel 3b and the roadway covering.

A vehicle according to the invention can also be configured as a two-wheeler in which a tilting frame 2 is configured tiltably relative to a main frame 1.

The contact elements of a vehicle according to the examples which are steerable by means of an axle pivot steering arrangement can be provided with suspension via shock absorbers and wishbones in the conventional manner.

All the examples of a vehicle according to the invention can have a locking means 57 (cf. FIG. 1) for the tilting frame 2 with which the tilting frame 2 can be fixed relative to the main frame 1 as required.

LIST OF REFERENCE SYMBOLS

1 Main frame
2 Tilting frame
3a, 3b Contact element (wheel, skid, caterpillar, float)
4 Stub axle
5 Handlebar
6 Steering tube
7 Track rod
8 Distance a between the steering axis and the point of application of the rotation of the steering tube on the track rod actuation element
9 Distance b between the tilt axis and the point of application of the tilting of the tilting frame on the track rod actuation element
10 Angle of lock λ
11 Steering gear
12 Sitting area
13 Knuckle arm
14 —
15 —
16 —
17 Drive unit (pedal drive, combustion engine and/or electric motor)
18 —
19 Pedal drive
20 —
21 —
22 Oscillating crank
23 Foot rest
24 Steering gear housing
24a Elongated hole
25 Standing area
26 Part-turn gearbox
27 Ball drive joint
28 Energy storage device
29 Power transmission means
30 Swivel wheel or swivel pinion
31 Skid
32 Drive caterpillar
33 Crank guide pin
34 Shock absorber
35 Tilt axis
36 Steering angle rotational steering α
37 Tilt angle tilting frame β
38 Toothed wheel segment
39 Track rod actuation element
40 Guide element
41 Steering arm
41a Pin
42 Rod
42a Tongue
42b Elongated hole
43 Track rod drive crank
43a Elongated hole
44 Pintle
45 Self-aligning ball bearing
46 Wheel mount
47 Movement axis
48 Positive rotation, steering
49 Negative rotation, steering
50 Positive tilting, tilting frame
51 Negative tilting, tilting frame
52 Positive shift, track rod S
53 Negative shift, track rod S
54 Drive wheel or drive pinion
55 —
56 Ball joint
57 Locking means
58 Castor angle λ
59 Steering axis
60 Front axle
61 Rear axle
62 —
63 Power transmission means
64 Drive wheel or drive pinion

The invention claimed is:

1. Vehicle having
a main frame to which there is fixed at least one ground contact element, which can be steered by means of an axle pivot steering arrangement,
a tilting frame which is tiltable relative to the main frame (1) and has a tilt axis,
a steering tube having a steering axis running obliquely or perpendicularly to the tilt axis,
at least one track rod and
a track rod actuation element
characterised in that the track rod actuation element is movable relative to the tilting frame and
by tilting of the tilting frame about the tilt axis and independently thereof by rotation of the steering tube about the steering axis is actuated such that the steerable contact element undergoes a steering movement by means of the at least one track rod, without a substantial change in the camber of the at least one steerable contact element taking place as a result during cornering,
characterised in that the track rod actuation element is mounted movably in a guide element and can be moved relative to the main frame by tilting of the tilting frame and independently thereof by rotation of the steering tube, for actuation of the at least one track rod.

2. A vehicle according to claim 1, characterised in that the track rod actuation element is arranged both at a distance from the tilt axis and at a distance from the steering axis.

3. A vehicle according to claim 1, characterised in that the steering tube is coupled to the tilting frame, in particular is connected to this in a fixed manner.

4. A vehicle according to claim 1, characterised in that the tilt axis is fixed relative to the main frame.

5. A vehicle according to claim 1, characterised in that the guide element is fixed to the tilting frame.

6. A vehicle according to claim 1, characterised in that a guide element is fixed to the main frame.

7. A vehicle according to claim 1, characterised in that the tilting frame is connected to the main frame via mounting units on a tilt axis lying in the direction of travel.

8. A vehicle according to claim 1, characterised in that at least a sitting or standing area for the driver, a handlebar or steering wheel and an associated steering tube is arranged on the tilting frame.

9. A vehicle according to claim 1, characterised in that a drive unit is arranged on the tilting frame and a part-turn gearbox is provided for bridging of the tilting movement between the tilting frame and the main frame, and the part-turn gearbox has at least one ball drive joint.

10. A vehicle according to claim 1, characterised in that a means for locking the tilting frame relative to the main frame is provided.

11. A vehicle according to claim 1 wherein the ground contact element comprises a wheel, a skid, a caterpillar chain or a float.

12. A vehicle according to claim 1 wherein the steering tube is coupled to the tilting frame such that on tilting the frame the steering will be also tilted.

13. Vehicle having
a main frame to which there is fixed at least one ground contact element, which can be steered by means of an axle pivot steering arrangement,
a tilting frame which is tiltable relative to the main frame (1) and has a tilt axis,
a steering tube having a steering axis running obliquely or perpendicularly to the tilt axis,
at least one track rod and
a track rod actuation element characterised in that the track rod actuation element is movable relative to the tilting frame and
by tilting of the tilting frame about the tilt axis and independently thereof by rotation of the steering tube about the steering axis is actuated such that the steerable contact element undergoes a steering movement by means of the at least one track rod, without a substantial change in the camber of the at least one steerable contact element taking place as a result during cornering,
characterised in that the track rod actuation element is fixed to the steering tube at a distance from the tilt axis and a distance from the steering axis so that this can be moved by tilting of the tilting frame and independently thereof by rotation of the steering tube, for actuation of the at least one track rod.

14. Vehicle having
a main frame to which there is fixed at least one ground contact element, which can be steered by means of an axle pivot steering arrangement,
a tilting frame which is tiltable relative to the main frame (1) and has a tilt axis,
a steering tube having a steering axis running obliquely or perpendicularly to the tilt axis,
at least one track rod and
a track rod actuation element characterised in that the track rod actuation element is movable relative to the tilting frame and
by tilting of the tilting frame about the tilt axis and independently thereof by rotation of the steering tube about the steering axis is actuated such that the steerable contact element undergoes a steering movement by means of the at least one track rod, without a substantial change in the camber of the at least one steerable contact element taking place as a result during cornering,
characterised in that a castor of the at least one steerable contact element causes, on steering in thereof, a righting moment on the tilting frame and the steering tube.

15. A vehicle according to claim 14, characterised in that a castor angle $\gamma$ is variable, so that the righting moment can be adapted individually to the wishes of the driver.

* * * * *